United States Patent [19]
Gayle

[11] 3,868,294
[45] Feb. 25, 1975

[54] REFLECTIVE MARKERS
[75] Inventor: Robert Gayle, Wilton, Conn.
[73] Assignee: National Patent Development Corporation, New York, N.Y.
[22] Filed: Mar. 31, 1972
[21] Appl. No.: 240,129

[52] U.S. Cl. ........................ 161/4, 161/64, 161/170, 161/175, 161/177, 161/180, 161/181, 117/35, 117/16, 117/18, 350/103, 350/97, 350/109, 40/130 B
[51] Int. Cl. ................................. B44f 1/02
[58] Field of Search ...... 117/17, 16, 18, 35 R, 35 S, 117/35 U; 161/4, 5, 64, 175, 177, 180; 350/97, 286, 103, 109; 40/130 B

[56] References Cited
UNITED STATES PATENTS

| | | |
|---|---|---|
| 3,215,039 | 11/1965 | Gill ........................................ 88/78 |
| 3,218,186 | 11/1965 | deVries ............................... 117/35 R |
| 3,220,871 | 11/1965 | Lemelson ............................ 117/35 R |
| 3,258,840 | 7/1966 | Hedgewick ........................... 350/103 |
| 3,575,773 | 4/1971 | Courtot .................................... 161/5 |

Primary Examiner—George F. Lesmes
Assistant Examiner—Wm. E. Ball
Attorney, Agent, or Firm—Cushman, Darby & Cushman

[57] ABSTRACT

Reflective surfaces, e.g. signs are made by impinging electrostatically charged particles having a reflective coating on an adhesive coated backing. By the use of appropriate hydrophilic polymers the reflective material can be made fog free.

9 Claims, 8 Drawing Figures

Fig. 1.
Fig. 2.
Fig. 3.
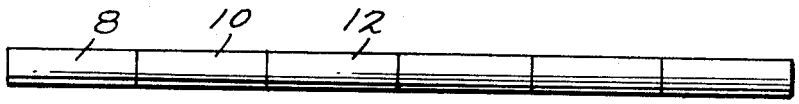
Fig. 4.
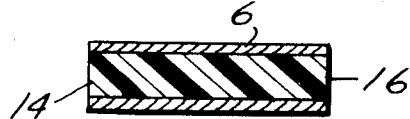
Fig. 5. Fig. 6. Fig. 7.
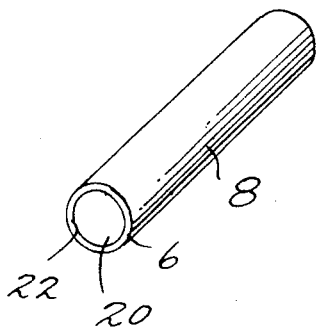 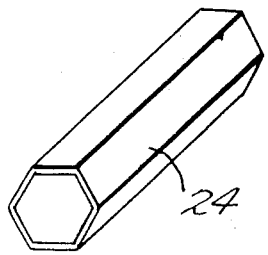 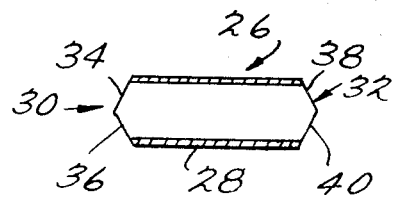
Fig. 8.
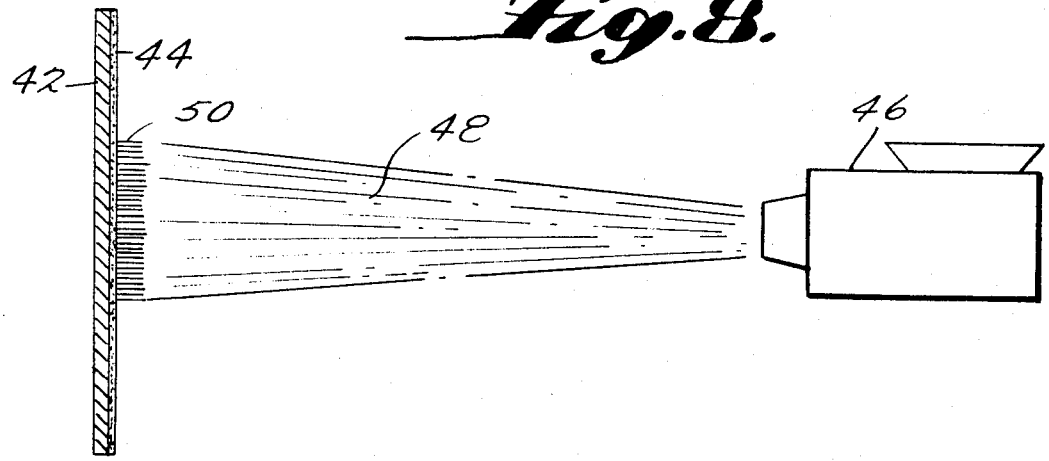

REFLECTIVE MARKERS

The present invention relates to novel reflective surfaces and their method of preparation.

In common use today are fibers of optical quality that are commonly used for the transmission of light from one point to another. Such fibers are made of glass or plastic.

If such a fiber of small diameter, e.g. 0.25 mm to 3 mm. were plated by any of the known techniques with a metal so that the inner surface of the outer surface of the fiber becomes a reflective surface, such a reflector would bounce light that approached it from any angle.

According to the invention such fibers having a reflective outer surface are cut crosswise into a plurality of little fibers usually having a length of 0.5 to 1.5 mm, but this can be varied, e.g. from 0.1 to 3 mm, having a clear solid front and back and having a reflective inner-outer surface around the diameter of the fiber.

The fibers are then mounted in quantity on a substrate, i.e., are objective to make a reflective sign. Such cut fibers can be mounted to the sign at any angle between 1° and 179°, usually 90°, depending on the use intended. To mount the cut fibers they are impinged on the substrate. Prior to impingement they are given electrostatic charge so that they will mount themselves directly at 90° to the surface of the substrate for example. Therefore, the clear or open end of the fiber will always be mounted in such a way as to always be ready to receive the imput of light. A beam of light entering such open or clear end will then instantly be reflected back to its source, multiplied by the inner reflective surface of the fiber. The opposite end of the fiber is mounted to the substrate, e.g. by the force of impingement on an adhesive bed. Said opposite end can also have an adhesive bed thereon which may even comprise a somewhat reflective surface. The product of the invention is a reflective source which would accept a light source from 1° to 179° and would reflect such light immediately back to its source.

The fibers or filaments employed are quite small in diameter and may be extruded or drawn by any conventional technique. They can be extruded continuously in a form which is circular, rectangular, triangular, pentagonal, hexagonal, octagonal or otherwise in cross section.

By the use of the electrostatic impingement technique, thousands to millions of such fibers can be impinged on a surface to create highly reflective areas. Using the technique of the invention a reflective sign can be made, for example, using methods employing only a stencil and the materials and procedures described supra.

As the backing or substrate for the sign there can be used metal, e.g. iron, steel or aluminum, wood, cardboard, plastic, e.g. filled polystyrene, pigmented polyvinyl chloride, polycarbonate, polyoxymethylene (Delrin), styrene-acrylonitrile, polypropylene, rubber, either natural or synthetic, e.g. butadiene-styrene copolymer, polyisoprene, butyl rubber, neoprene, glass laminate, e.g. glass fiber reinforced polyester (e.g. styrene modified ethylene glycol-propylene glycol-adipate-maleate), or glass fiber reinforced epoxy resin (e.g. bisphenol A-epichlorhydrin resin), etc. The substrate can be plain or can have a coating of paint thereon.

As the filaments there can be used any clear plastic such as glass or clear organic plastics such as biaxially oriented polystyrene, uniaxially oriented polyvinyl chloride, biaxially oriented polyvinyl chloride, biaxially oriented polyethylene, cross-linked biaxially oriented polyethylene (e.g. polyethylene cross-linked by being irradiated to an extent of 4 to 30 megarad, preferably about 6–12 megarad as set forth in Baird U.S. Pat. No. 3,022,543), biaxially oriented polypropylene, biaxially oriented polycarbonate), regenerated cellulose, polymethyl methacrylate, methyl methacrylate-ethyl acrylate copolymer (e.g. 90:10), cellulose acetate-butyrate, phenol-formaldehyde resin, melamine-formaldehyde resin, ureaformaldehyde resin, clear polyurethane, clear nylon (e.g. nylon 66 or nylon 6).

The preferred polymers for making the fiber or filament, however, are water insoluble, hydrophilic polymer which are capable of absorbing water and making the surface clear under conditions which normally cause fogging of the transparent surface. Preferably there are employed hydrophilic acrylate or methacrylate polymers such as polymers of hydroxy lower alkyl acrylates or methacrylates or hydroxy lower alkoxy lower alkyl acrylates or methacrylates, e.g. 2-hydroxyethyl acrylate, 2-hydroxy-ethyl methacrylate (HEMA), diethylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate and dipropylene glycol monomethacrylate. The most preferred monomer is HEMA.

The hydroxyalkyl acrylate or methacrylate less preferably can also be replaced in part by vinyl pyrrolidone, acrylamide, methacrylamide, N-propyl acrylamide, N-isopropyl methacrylamide, N-methylacrylamide, N-methylmethacrylamide, N-methylol acrylamide and N-methylol methacrylamide, N-2-hydroxyethyl acrylamide, N-2-hydroxyethyl methacrylamide. However, these monomers usually form water soluble homopolymers and hence they require the presence of a cross-linking agent or copolymerization with a sufficient amount of the hydroxyalkyl acrylates and methacrylates to render the copolymers water insoluble.

Other ethylenically unsaturated monomers can be used in conjunction with the above monomers or copolymers. They include neutral monomers such as acrylonitrile, methacrylonitrile, vinyl acetate, alkyl acrylates and methacrylates, alkoxyalkyl acrylates and methacrylates.

Examples of alkyl acrylates and methacrylates include methyl acrylate, ethyl acrylate, butyl acrylate, 2-ethylhexyl acrylate, methyl methacrylate and butyl methacrylates. Examples of suitable alkoxyalkyl acrylates and methacrylates are methoxyethyl acrylate, methoxyethyl methacrylate, ethoxyethyl acrylate, ethoxyethyl methacrylate, propoxyethyl acrylate, butoxyethyl methacrylate, methoxypropyl acrylate, ethoxypropyl methacrylate. These comonomers when used in an amount preferably not higher than 50 percent (and usually between 0.5 and 20%) of the monomeric mixture contribute to improve the mechanical properties of the gel. They should not be used in an amount to impair the hydrophilic nature of the polymer if antifogging properties are to be retained. Other vinyl monomers bearing ionizable functional groups can be copolymerized with the hydroxyalkyl acrylates or methacrylates. They include acidic type monomers such as acrylic acid, methacrylic acid, maleic acid, fumaric acid, itaconic acid, aconitic acid, cinnamic acid, crotonic acid, propiolic acid, citraconic acid, vinyl sulfonic acid, p-vinylbenzenesulfonic acid, partial esters such as mono-2-hydroxyethyl itaconate, mono-2-hydroxypropyl citraconate, mono-2-hydroxyethyl maleate, mono-2-hydroxypropyl fumarate, monomethyl itaconate, monoethyl itaconate, monomethyl cellosolve itaconate (Methyl Cellosolve is the monoethyl ether of diethylene glycol), monomethyl Cellosolve maleate, mono-2-hydroxyethyl aconitate.

Basic type monomers can be included such as aminoethyl methacrylate, dimethyl aminoethyl methacrylate, monomethylaminoethyl methacrylate, t-butylaminoethyl methacrylate, p-aminostyrene, o-aminostyrene, 2-amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2-pyrrolidinoethyl methacrylate, 3-(dimethylaminoethyl)-hydroxypropyl acrylate, 3-(dimethylaminoethyl)-2-hydroxypropyl methacrylate, 2-aminoethyl acrylate, 2-aminoethyl methacrylate. The alkylaminoethyl acrylates and methacrylates are preferred in this group. These ionogenic monomers should not be used in sufficient amounts to render the hydroxyalkyl acrylates or methacrylates water soluble. Multipolymers can be prepared from a mixture of three, four or more of the above monomers. These modifying monomers are usually used in an amount of 0.1 – 20%, preferably 1 to 15% of the total monomers. To insure insolubility the polymer can be sparingly cross-linked. Preferably, the cross-linking agent is added in an amount of 1 to 10%, most preferably not over 2.0%, although from 0.05 to 15% or even 20% of cross-linking agents can be used. Cross-linking renders those polymers which would be otherwise organic solvent soluble or water soluble polymers insoluble, although it does not impair the hydrophilic properties.

Typical examples of cross-linking agents include ethylene glycol diacrylate, ethylene glycol dimethacrylate, 1,4-butylene dimethacrylate, diethylene glycol dimethacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl malate, divinyl tartrate, triallyl melamine, N,N'-methylene bisacrylamide, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1, 3, 5-triacryltriazine, triallyl phosphite, diallyl ether of benzene phosphonic acid, polyester of maleic anhydride with triethylene glycol, diallyl aconitrate, divinyl citraconate, diallyl fumarate, ammonium dichromate.

Suitable hydrophilic polymers are also disclosed in Shepherd U.S. Pat. No. 3,488,215, Shepherd U.S. Pat. No. 3,515,579 and Shepherd U.S. Pat. No. 3,618,213, e.g. the fibers of example 9a having a diameter of 0.01 inch (0.254 mm) or fibers made by the procedure of example 31 omitting the Nilevar and slicing the cylinder to form fibers or fine filaments formed as in example 39 omitting the menthol and the chopping step.

As the reflective coating on the fiber there is preferably employed a metal, most preferably silver, but there can be employed other metals such as stainless steel, nickel, copper, chromium, gold, zinc, aluminum, titanium, beryllium, tin, platinum, palladium, iridium, rhodium, Monel metal.

The metal coating can be applied on the clear glass or clear plastic by any conventional technique, e.g. by plating from a solution or by vacuum evaporation. The thickness of the metal coating is not critical and can be, as is conventional in the art, e.g. 0.000005 inch (0.000127 mm). It can vary for example from 0.000025 mm. to 0.05 mm.

As the adhesive for adhering the cut fibers to the substrate there can be used by any suitable adhesive. Thus there can be used pressure sensitive adhesives, e.g. see U.S. Pat. Nos. 2,177,627; 2,410,053 and 2,410,078. Also there can be used epoxy adhesives, e.g. epichlorhydrin-bisphenol A. Likewise there can be used a tacky partial polymer, e.g. tacky partially polymerized hydroxyethyl methacrylate-ethylene glycol dimethacrylate (100:0.2), and then after the cut fibers are adhered to the adhesive the polymerization of the tacky polymer can be completed.

Unless otherwise indicated all parts and percentages are by weight.

The invention will be understood best in connection with the drawings wherein

FIG. 1 is a view of a filament or fiber;

FIG. 2 is a sectional view of a metal coated fiber;

FIG. 3 is a view showing the manner of cutting the filament into smaller fibers;

FIG. 4 is a longitudinal view of a cut fiber;

FIG. 5 is a perspective view of a cut fiber;

FIG. 6 is a perspective view of another type of cut fiber;

FIG. 7 is a view of an alternative form of cut fiber, and

FIG. 8 is a view illustrating in diagrammatic form the process of the invention.

Referring more specifically to the drawings there are provided long or continuous cylindrical fibers 2, e.g. of clear, transparent hydroxyethyl methacrylate-ethylene glycol dimethacrylate copolymer (e.g. 100:0.3). The outer surface 4 of the fiber is coated by any conventional process with a metal 6, e.g. a 0.000127 mm film of silver. Thus there is provided a coated surface with a reflecting surface to the inner side. It is like a rolled up mirror.

The coated filament is then cut up into small fibers, 8, 10, 12, etc. having a length of 1 mm for example.

As shown in FIG. 4 a cut fiber 8 circular in cross section made of the HEMA-ethylene glycol dimethacrylate copolymer (100:0.3) has an outer coating of silver 6. However, as a result of the cutting the open ends 14 and 16 are clear. As can be best seen in FIG. 5 there is a clear solid 20 in the central portion of the end which extends through the length of the fiber. It is of course surrounded by the external metal coating 6. This results in the inner reflective surface 22 due to the outer mirror coating of metal.

As shown in FIG. 6 the filaments which are extruded or cut need not be circular in cross section. Thus in FIG. 6 the filament 24 is hexagonal in cross section. It can be given a reflective metal coating in the same manner as the cylindrical filament 2.

As shown in FIG. 7 a cut fiber, e.g. of glass, designated generically at 26 has a metal coating 28, e.g. of silver, having a thickness of 0.0002 mm. The cut ends 30 and 32 are clear (except for the thickness of the metal coating). In this Figure instead of the ends formed by a cut perpendicular to the axis of the filament, they are formed by cutting a V or an inverted V so that instead of a single surface each end is in fact two surfaces, e.g. end 30 is composed of surfaces 34 and 36 and end 32 is composed of surfaces 38 and 40. The ends of the fibers can be cut with any other desired angular configurations, e.g. both ends can be V shaped or U shaped, etc.

As shown in FIG. 8 a substrate, e.g. a painted metal sheet 42 is provided with an adhesive layer 44 (e.g. bisphenol A-epichlorhydrin). Metal coated cut fibers, e.g. HEMA ethylene glycol dimethacrylate copolymer 100:0.3 coated with silver) are fed into electrostatic spray gun 46. The charged fibers 48 emerging from the gun are impinged as at 50 on the metal sheet. The metal sheet (substrate) can be held in different relative positions or the gun can be held in different positions to get varying angles of impingement.

If desired the end of the fibers adhered to the substrate need not be clear and transparent.

While the adhesive is shown applied to the substrate, the adhesive can also be applied to the fibers in addition to or in place of being applied to the substrate, e.g. an adhesive made of the same polymer as that of the fiber, but in a less advanced stage of polymerization, can be used.

What is claimed is:

1. A substrate having adhered thereto a plurality of thin, short, individual fibers, said fibers each having an inner end which is adhered to said substrate and having an opposite and exposed outer end, said fibers each comprising a central, clear transparent portion which extends longitudinally from said inner end to the outer end of the fiber, and an external, longitudinally extending from said inner end to said outer end, mirror coating on said transparent portion forming a reflective surface to the inner side thereof, whereby when light is impinged on said fibers it is reflected back toward its source.

2. A substrate according to claim 1 wherein the mirror coating is a metal coating.

3. A substrate according to claim 2 wherein said fibers are glass fibers.

4. A substrate according to claim 2 wherein the fibers are water insoluble, hydrophilic water absorbing fibers whereby the reflective surface is rendered fog free.

5. A substrate according to claim 1 wherein the fibers have a length of 0.1 to 3 mm.

6. A substrate according to claim 5 wherein the fibers have a length of 0.5 to 1.5 mm.

7. A substrate according to claim 5 wherein the mirror coating is a metal coating.

8. A substrate according to claim 7 wherein said fibers are glass fibers.

9. A substrate according to claim 7 wherein said fibers are water insoluble hydrophilic water absorbing fibers whereby the reflective surface is rendered fog free.

* * * * *